United States Patent [19]

Schneider et al.

[11] 4,308,072

[45] Dec. 29, 1981

[54] PLASTICIZED SULFUR COMPOSITION

[75] Inventors: Ronald A. Schneider, Albany; Milutin Simic, Novato, both of Calif.

[73] Assignee: Chevron Research, San Francisco, Calif.

[21] Appl. No.: 956,700

[22] Filed: Nov. 1, 1978

Related U.S. Application Data

[63] Continuation-in-part of Ser. No. 718,238, Aug. 27, 1976, abandoned, and a continuation-in-part of Ser. No. 733,636, Oct. 18, 1976, abandoned.

[51] Int. Cl.³ .............................................. C07G 17/00
[52] U.S. Cl. ................................. 106/287.26; 106/32; 106/29
[58] Field of Search ................. 252/46.6, 45; 528/389; 106/20, 287.32, 287.29, 23, 26

[56] References Cited

U.S. PATENT DOCUMENTS

| | | | |
|---|---|---|---|
| 2,046,871 | 7/1936 | Duecker et al. | 528/389 |
| 3,453,125 | 7/1969 | Williams | 106/19 |
| 3,935,352 | 7/1976 | Toland | 156/325 |
| 4,026,719 | 5/1977 | Simic | 106/287.32 |

*Primary Examiner*—Theodore Morris
*Attorney, Agent, or Firm*—J. A. Buchanan, Jr.; T. G. DeJonghe; L. S. Squires

[57] ABSTRACT

A composition comprising 50 to 98 weight percent sulfur, 0.2 to 20 weight percent of an organic compound reactive with sulfur to plasticize sulfur, 1 to 40 weight percent mica, and 0.02 to 5 weight percent phosphorus sulfide. Preferably the organic compound used to plasticize the sulfur is dicyclopentadiene or a glycol. The composition is advantageously used to coat a concrete or metal surface and thereby obtain a coated surface which is resistant to acid attack and resistant to crazing on exposure to fluctuating temperatures.

4 Claims, No Drawings

PLASTICIZED SULFUR COMPOSITION

CROSS REFERENCE TO RELATED APPLICATIONS

This application is a continuation-in-part of applications Ser. No. 718,238, filed Aug. 27, 1976, and Ser. No. 733,636, filed Oct. 18, 1976 both now abandoned.

BACKGROUND OF THE INVENTION

The present invention relates to a plasticized sulfur composition, which composition is useful for coating walls or other surfaces to form an acid- or corrosion-resistant surface which is resistant to cracking upon exposure to fluctuating temperatures.

Plasticized sulfur mixtures are disclosed in various references. For example, J. I. Jin gives the following tabular comparison of plasticized sulfur compositions in his report given at the ACS Los Angeles meeting, Symposium on New Sulfur Chemistry, Apr. 19, 1974, page 235:

TABLE I
COMPARISON OF PLASTICIZED SULFUR COMPOSITIONS

| Plasticizer | Melt Viscosity Regulator | Reference |
|---|---|---|
| Mixture of dithio and higher thiols | Chlorinated Polyphenyls | (2) |
| Arylenepolysulfide (ZM-399)* and aliphatic polysulfide (LP-3)** | None | (3,6) |
| OH<br>\|<br>H—(SCH$_2$CH—CH$_2$S)—nH<br>and styrene | Diphenyl dithiophosphate | (4) |
| Dithiol | Monomercaptan | (5) |

*Thiokol's styrene polysulfide
**Thiokol's liquid polysulfide
(2) Louthan, R. P., U.S. Pat. No. 3,434,852 (March 1969).
(3) Barnes, M. D., U.S. Pat. No. 3,316,115 (April 1967).
(4) Signouret, J. B., U.S. Pat. No. 3,560,451 (February 1971).
(5) Kane, J. C., U.S. Pat. No. 3,447,941 (June 1969).
(6) Dale, J. M., Report No. 1 (Sept. 1961); Report No. 2 (April 1962); Report No. 3 (June 1963), Project 1092-2, Southwest Research Institute.

In "New Uses of Sulfur", James R. West, Editor, Advances in Chemistry Series 140, ACS, Washington, D.C., 1975, B. R. Currell et al describe various sulfur plasticizers in their report tilted "Plasticization of Sulfur". The report gives a study of the chemical interaction of additives (such as polymeric polysulfides, unsaturated hydrocarbons and phenolic derivatives) with sulfur and also measurement, using differential scanning calorimetry and electron microscopy, of the rate of crystallization of sulfur in the presence of these additives. Limonene, myrcene, dicyclopentadiene and cycloocta-1,3-diene were found particularly effective in retarding sulfur crystallization.

British Pat. No. 1,182,171 describes plasticization of sulfur using a dithio polysulfide, an olefin polymer, and an ethylenically unsaturated compound wherein the above constituents are heated and mixed with sulfur at a temperature between 100° and 200° C. to form a homogeneous plastic. The dithio polysulfide used was of the formula

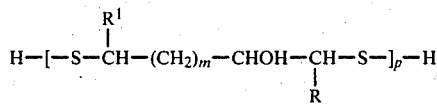

The dithio polysulfide was referred to in the British patent as an Rs resin.

The British patent teaches that the dithio compound is necessary in order to secure reaction of the olefin polymer and the ethylenically unsaturated compound with the sulfur. Thus, the British patent states on page 2:

"The use of the resin R$_s$ is thus necessary for the reaction with the olefine polymer and optionally a monomeric ethylenically unsaturated compound."

U.S. Pat. No. 3,465,064 discloses a plasticized sulfur reported to have good adhesion to various surfaces, which plasticized sulfur is prepared by incorporating into molten sulfur a polythiomethylene alkanol, an olefin polymer and optionally an ethylenic compound, and in heating the material thus obtained until there is formation of a homogeneous and plastic composition.

The use of phosphorus sulfide, in particular P$_2$S$_5$, has been disclosed as a sulfur plasticizer. See, for example, U.S. Pat. No. 3,935,352 to W. G. Toland. U.S. Pat. No. 3,459,717 also discloses the use of a diester of dithiphosphoric acid in plasticization of sulfur, and the diester is prepared by reacting an alcohol or phenol with P$_2$P$_5$. One classic reference book [Beat Meyer, ed., Elemental Sulfur (Intescience Publishers, New York, 1965) p. 359] gives modifiers that tend to make sulfur rubbery, then states that in contrast phsophorus "produces such extensive crosslinking that only a glassy material is produced."

U.S. Pat. No. 3,453,125 is directed to a method of reducing the viscosity of plasticized sulfur compositions by forming a mixture of plasticized sulfur with a persulfide compound. The persulfide additive can be prepared by the reaction of elemental sulfur with a mercapto compound selected from mercapto acids, mercapto alcohols, etc.

Materials for plasticizing the sulfur according to U.S. Pat. No. 3,453,125 include ". . . aryl polysulfides, alkyl polysulfides, organic polythiols, chlorinated polyphenyls, wood rosin, natural rubber, butyl rubber, olive oil, organic esters, alkyl resins, and the like, and combinations of these. Particularly applicable are the sulfur compositions plasticized by organic polythiols."

The use of mica in plasticized sulfur compositions is disclosed in commonly assigned U.S. Pat. No. 4,026,719. Plasticizers disclosed in U.S. Pat. No. 4,026,719 include inorganic materials such as iron, arsenic, and phosphorus sulfides, but the particularly preferred plasticizers are stated to be organic compounds.

SUMMARY OF THE INVENTION

The present invention provides a composition comprising 50 to 98 weight percent sulfur, 0.1 to 25 weight percent of an organic compound reactive with sulfur to plasticize sulfur, 1 to 40 weight percent mica, and 0.02 to 5 weight percent phosphorus sulfide.

Among other factors, the present invention is based on our findings that molten sulfur plasticized with an organic compound and also containing incorporated P$_2$S$_5$ and mica has surprisingly advantageous properties, particularly including good strength resistance upon exposure to acid solutions and also exceptionally good resistance to crazing or cracking upon exposure to fluctuating temperature conditions. Preferably the composition is prepared by steps including reacting molten sulfur with the organic compound and with the phosphorus sulfide at a temperature between 105° and 160° C. and mixing the molten material with mica. The mica may be combined with the molten sulfur either before, after, or concurrently with the reacting of the sulfur with the organic compound and the phosphorus sulfide. Preferably the mica is added after the organic compound and the phosphorus sulfide.

The composition of the present invention includes an organic alcohol reacted with sulfur to plasticize the sulfur and thus the organic compound serves as a sulfur plasticizer. A sulfur plasticizer is used to mean something that plasticizes sulfur or results in plasticized sulfur. In turn, "plasticized sulfur" as the term is used herein usually has a slightly lower melting point than elemental sulfur. Furthermore, plasticized sulfur requires a longer time to crystallize; i.e., the rate of crystallization of plasticized sulfur is slower than that of elemental sulfur. One useful way to measure the rate of crystallization is as follows: the test material (0.040 g) is melted on a microscope slide at 130° C. and is then covered with a square microscope slide cover slip. The slide is transferred to a hot plate and is kept at a temperature of 78°±2° C., as measured on the glass slide using a surface pyrometer. One corner of the melt is seeded with a crystal of test material. The time required for complete crystallization is measured. Plasticized sulfur, then, is sulfur containing an additive which increases the crystallization time within experimental error, i.e., the average crystallization time of the plasticized sulfur is greater than the average crystallization time of the elemental sulfur feedstock. For the present application, plasticizers are those substances which, when added to molten elemental sulfur, cause an increase in crystallization time in reference to the elemental sulfur itself.

Organic compounds which are suitable to plasticize the sulfur in accordance with the composition of the present invention include aliphatic polysulfides, aromatic polysulfides, styrene, dicyclopentadiene, dioctylphthalate, acrylic acid, epoxidized soybean oil, triglycerides, tall oil fatty acids, $C_{10}$–$C_{30}$ monoolefins, especially linear monoolefins as described in commonly assigned Ser. No. 718,236 to R. A. Schneider, titled "Monoolefinic Plasticized Sulfur" and filed on or about Aug. 27, 1976, and also terpenes, namely camphene, alpha-pinene, beta-pinene, dipentene, and myrcene.

One class of preferred plasticizers is olefinic compounds which react with molten sulfur to form aliphatic polysulfides. Dicyclopentadiene, 1-decene, and camphene are particularly preferred.

Another class of preferred plasticizers for use in the composition of the present invention are aromatic polysulfides formed by reacting one mol of an aromatic carbocyclic or heterocyclic cyclic compound, substituted by at least one functional group of the class —OH or —NHR in which R is H or lower alkyl with at least two mols of sulfur.

Suitable aromatic compounds of this type include: phenol, aniline, N-methylaniline, 3-hydroxythiophene, 4-hydroxypyridine, p-aminophenol, hydroquinone, resorcinol, meta-cresol, thymol, 4,4'-dihydroxybiphenyl, 2,2-di(p-hydroxyphenyl)propane, di(p-hydroxyphenyl)methane, p-phenylene diamine, methylene dianiline, etc. Phenol is an especially preferred aromatic compound to form the aromatic polysulfide.

The aromatic polysulfides are generally prepared by heating sulfur and the aromatic compound at a temperature in the range of 120° to 170° C. for 1 to 12 hours, usually in the presence of a base catalyst such as sodium hydroxide. (See for example, Angew, Chem V.70, No. 12, pages 351–67 (1958)). The polysulfide product made in this way has a mol of aromatic compound:sulfur of the 1:2 to 1:10, preferably 1:3 to 1:7. Upon completion of the reaction, the caustic catalyst is neutralized with an acid such as phosphoric or sulfuric acid. Organic acids may also be used for this purpose. The resulting aromatic polysulfide may be used immediately or it may be cooled and stored for future use.

Another type of aliphatic polysulfide useful as a plasticizer for this invention are the linear aliphatic polysulfides. Although these polysulfides may be used alone as the sulfur plasticizer, it is preferred to use them in combination with either (a) dicyclopentadiene or (b) the aromatic polysulfides described above, especially with the phenol-sulfur adduct. In this connection, the preferred plasticizer mixtures contain from 5% to 60% linear aliphatic polysulfide by weight based on total plasticizer, preferably about 10 to 30 weight percent.

These aliphatic polysulfides may have branching indicated as follows:

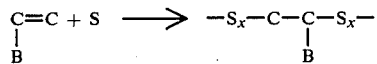

wherein x is an integer of from 2 to 6 and wherein B is H, alkyl, aryl, halogen, nitrile, ester or amide group. Thus in this connection the aliphatic polysulfide is preferably a linear polysulfide. The chain with the sulfur preferably is linear, but it can have side groups as indicated by "B" above. Also, this side group "B" may be aromatic. Thus styrene can be used to form a phenyl substituted linear aliphatic polysulfide. The preferred aliphatic polysulfides of this type are both linear and non-branched.

Unbranched linear aliphatic polysulfides include those such as Thiokol LP-3 which contains an ether linkage and has the recurring unit:

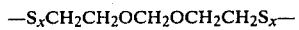

wherein x has an average value of about 4. The ether constituent of this aliphatic polysulfide is relatively inert to reaction. Other suitable aliphatic polysulfides have the following recurring units:

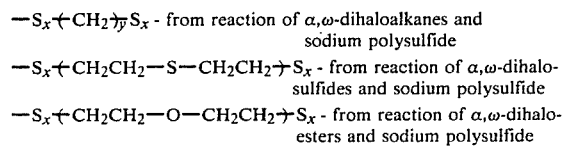

wherein x is an integer of 2 to 5; and y is an integer or 2 to 10.

Another class of plasticizers are sulfur soluble glycols. The term "glycol" is used herein to mean an organic compound containing either two hydroxyl groups or one hydroxyl group and one sulfhydryl group. Suitable glycols are aliphatic compounds having 2–20, preferably 2–6 carbon atoms, and having the hydroxyl groups or hydroxyl group and sulfhydryl group attached to adjacent or nonadjacent carbon atoms. The aliphatic structure holding the hydroxyl groups or hydroxyl group and sulfhydryl group is preferably composed of carbon and hydrogen but may have one or more ether or thioether groups in the molecule. Specific examples of glycols are ethylene glycol, 1,2-butane diol, 1,4-butane diol, 1,2-dodecane diol, 1,20-eicosane diol, 1,5-hexane diol, diethylene glycol, 3,6-dioxaoctane-1,8-diol, 3,6,9-trithiaundecane-1,11-diol, mercaptoethanol, 6-mercaptohexanol, 2-mercaptoeicosanol. Preferably, the ratio of mols of glycol to gram atoms of phosphorus is 0.2 to 1.5, preferably 0.4 to 1.

Sulfur plasticized with glycols according to the present invention tend to have a strong odor. It was found that dicyclopentadiene added to the molten mixture greatly reduces the odor of the solidified composition. Other olefins, such as terpenes and linear olefins, are expected to reduce the odor as well.

Preferred organic compounds for plasticizing sulfur herein include those disclosed in commonly assigned application Ser. No. 601,552, especially the mixtures of aromatic and aliphatic polysulfides disclosed therein. The disclosure of Ser. No. 601,552 is incorporated herein by reference.

The quantity of sulfur plasticizer used in the present invention varies broadly from 0.1 to 25.0 percent by weight based on total weight of the composition. Preferably the amount used is in the range of about 0.5 to 5 percent.

As is indicated above, mica is a critically important element of the composition of the present invention. The term "mica" is used herein to mean a layered silicate having an x-ray diffraction pattern d spacing about 9.6 to 10.1 Å, preferably a d spacing of about 9.9 to 10.1 Å. Talc material also is a layered silicate, but has a d spacing of about 9.35 Å. Satisfactory mica particles cover a very broad range of sizes. It is preferred that at least 90 percent pass through a 40-mesh (Tyler) screen. Satisfactory particles have sizes ranging in diameter from 0.001 to 2 mm and in thickness from 0.0005 to 0.2 mm.

Typical amounts of mica in the formulation are about 1 to 40 weight percent, preferably 5 to 30 weight percent, and particularly preferred amounts are 10 to 20 weight percent.

Preferred micas for use in the composition of the present invention are phlogopite, muscovite, zinnwaldite and biotite, which are natural micas, and fluorophlogopite and barium disilic, which are synthetic micas.

Particularly preferred micas for use in the present invention contain potassium and have a chemical composition of $3Al_2O_3 \cdot 6SiO_2 \cdot 2H_2O$, also written $K_2Al_4(Al_2Si_6O_{20})(OH)_4$ or $KAl_2(AlSi_3O_{10})(OH)_2$. Mica differs from talc in that talc typically does not contain potassium. Kirk-Othmer Encyclopedia of Chemical Technology, 2d Ed., Vol. 19, page 608, gives the following chemical formula for talc: $Mg_3SiO_{10}(OH)_2$.

The composition of the present invention is especially advantageously used as a coating material. Thus, in accordance with another embodiment of the present invention a method is provided for obtaining a coated surface on concrete, brick, cement, stucco, plaster, earth, rock, metal and the like resistant to acid attack and cracking which comprises coating the surface with the composition of the present invention.

In accordance with this embodiment of the present invention wherein a method for obtaining a coating is provided the composition is applied while molten, preferably at a temperature of 105° to 150° C.

In addition to the method for obtaining a coating using the composition of the present invention, the present invention also embraces these materials as coating compositions per se.

The composition can be applied by spraying, rolling, or brushing onto the surface, preferably by spraying. Preferably the composition is applied to a thickness of 1/32 to ¾ inch, more preferably 1/16 to ⅜ inch.

EXAMPLES

In Table II below are shown the results of a series of relatively severe tests designed to evaluate the resistance to deterioration of sulfur coatings subjected to thermal stress. The coatings were prepared by adding the various listed plasticizers to molten sulfur at about 150° C. stirred in a three-neck round-bottom flask with reflux condenser. After about one or two hours, the filler was added. After about another hour the molten composition was poured to a depth of ¼ inch on a 5-inch by 5½-inch concrete block. This block was obtained by sawing a commercial 6-2-16 lightweight concrete block cap into three equal parts which were then washed, dried at 140° F., and stored at room temperature in air.

The morning after the composition was poured, its surface was examined using a 7-power, lighted magnifying glass. It was regarded as having failed if any crack could be observed sufficiently distinctly that the gap between the two surfaces was undeniable. Fine cracks could barely be distinguished by the naked eye upon knowing where to look. The block was also regarded as having failed if a gap at least 0.5 mm wide appeared between the sulfur and the concrete along at least one entire side, so that it was visually apparent that a substantial portion of the sulfur was no longer in contact with the concrete.

If no failure occurred following pouring, the block was placed in a 120° F. oven for eight hours, then removed and left at room temperature overnight. The next morning, blocks were inspected and placed in the oven again for eight hours, then placed directly in a refrigerator at 50° F. Each succeeding day the refrigerator temperature was lowered by 5° F.; and each morning the blocks were inspected after removal from the refrigerator, and surviving blocks were placed in the oven.

The mica employed in every case was P-80F mica, 30%–40% $\geq$325 mesh obtained from U.S. Gypsum. In the table, DCP stands for dicyclopentadiene and PSA for phenol sulfur adduct, an aromatic polysulfide made by reacting phenol with at least 2 mols of sulfur per mol phenol, preferably using a base catalyst. LP-3 stands for a linear aliphatic polysulfide made by Thiokol Chemical Co.

The alpha-pinene-$P_2S_5$ concentrate was prepared by heating a mixture of 102 g of alpha-pinene with 20.5 g of $P_2S_5$ at about 130° C. for about 2 hours, until the $P_2S_5$ disappeared, and then removing the excess of pinene by distillation at 5 torr in a 70° C. bath.

Table II data shows that in every case we tried with mica present, addition of phosphorus sulfide improved resistance to cracking and delamination. In every case when the mica was omitted, cracking and/or delamination was observed after pouring whether phosphorus sulfide was added or not. Thus with both the phosphorus sulfide and the mica a composition of unexpectedly good craze resistance was obtained.

Examples 2–4 show that in the absence of any other plasticizers or fillers, mica and $P_2S_5$ together conferred reasonable crack resistance to sulfur; yet separately either gave a very poor composition.

Examples 5-12, 13-14, 16-17, 18-19 and 24-25 show that a broad range of organic plasticizers can be used, with benefits from $P_2S_5$-mica obtained in each case.

Examples 9 and 10, wherein the number of gram-atoms of phosphorus is approximately the same in each case, show that different phosphorus sulfides gave substantially the same result. The term "phosphorus sulfide" as used herein is meant to include any compound or mixture of compounds whose elemental composition is nothing but phosphorus and sulfur. Since elemental phosphorus is known to react with molten sulfur to give phosphorus sulfides, this includes the addition of elemental phosphorus to molten sulfur coating compositions. Apparently phosphorus or any phosphorus sulfide when dissolved in molten sulfur tends to approach the same end state if sufficient time is allowed for complete reaction.

Examples 5-12 show that throughout the range examined, from 0.008 weight percent to 0.8 weight percent of elemental phosphorus, phosphorus sulfides improved the mica-containing composition. Amounts larger than 1 weight percent P (3.5 weight percent $P_2S_5$) are probably less desirable because they would probably increase susceptibility to corrosion. Amounts smaller than 0.005 weight percent P (0.018 weight percent $P_2S_5$) are probably less desirable because of the risk that they might be consumed in side reactions with small amounts of impurity.

When the composition of Example 16 was poured on a concrete block, lumps of incompatible material were poured out with the molten composite, the color was the greenish-yellow typical of sulfur which contains mica, and the adhesion of the coating to the block was poor. When 0.7 percent $P_2S_5$ was incorporated with those same components (Example 17), a uniform solution was obtained which gave an even coating showing good adhesion and which was dark gray in color. A $P_2S_5$ composition without methylcyclopentadiene dimer was greenish-yellow like the methylcyclopentadiene dimer composition without $P_2S_5$. The color change suggests that the improved properties of the olefin-containing mixture may be due to chemical reaction in the overall $P_2S_5$-mica-olefin-sulfur mixture.

Examples 4, 24 and 25 show that the pinene-$P_2S_5$ combination outperformed mica-containing compositions where either pinene or $P_2S_5$ plasticizer was used without the other.

Examples 26-30 compared to 31-33 show that the combination of a glycol and a phosphorus sulfide is distinctly superior to phosphorus sulfide alone or to glycol alone in conferring resistance to cracking to sulfur composition.

Examples 26-30 and 37-49 show that a variety of glycols can be used. Compounds with two hydroxyl groups are preferred. Examples 39 vs. 40 and 47 vs. 49 show that different phosphorus sulfides give similar results as long as the number of gram atoms of phosphorus added is the same.

Examples 41-49, in particular 46 vs. 40, show that an olefin added to the glycol-phosphorus sulfide composition increases strength. It also decreases odor.

TABLE II

| Ex. No. | Components | Wt. % | No. of Cycles to Failure |
|---|---|---|---|
| 1 | sulfur | 100 | 0 |
| 2 | sulfur | 99.3 | 0 |
|   | $P_2S_5$ | 0.7 |  |
| 3 | sulfur | 84 | 0,0 |
|   | mica | 16 |  |
| 4 | sulfur | 83.3 | 6,6 |
|   | mica | 16.0 |  |
|   | $P_2S_5$ | 0.7 |  |
| 5 | sulfur | 83.0 | 0,0,0,0 |
|   | mica | 16.0 |  |
|   | DCP | 1.0 |  |
| 6 | sulfur | 83.0 | 3,3 |
|   | mica | 16.0 |  |
|   | DCP | 1.0 |  |
|   | $P_2S_5$ | 0.03 |  |
| 7 | sulfur | 82.9 | 2,4 |
|   | mica | 16.0 |  |
|   | DCP | 1.0 |  |
|   | $P_2S_5$ | 0.1 |  |
| 8 | sulfur | 82.7 | 2,2,3,3 |
|   | mica | 16.0 |  |
|   | DCP | 1.0 |  |
|   | $P_2S_5$ | 0.35 |  |
| 9 | sulfur | 82.3 | 2,3,4,4 |
|   | mica | 16.0 |  |
|   | DCP | 1.0 |  |
|   | $P_2S_5$ | 0.7 |  |
| 10 | sulfur | 82.7 | 4,4 |
|   | mica | 16.0 |  |
|   | DCP | 1.0 |  |
|   | $P_4S_3$ | 0.35 |  |
| 11 | sulfur | 81.6 | 0,1,3,5 |
|   | mica | 16.0 |  |
|   | DCP | 1.0 |  |
|   | $P_2S_5$ | 1.4 |  |
| 12 | sulfur | 80.0 | 1,1 |
|   | mica | 16.0 |  |
|   | DCP | 1.0 |  |
|   | $P_2S_5$ | 3.0 |  |
| 13 | sulfur | 81.5 | 3,3 |
|   | mica | 16.5 |  |
|   | PSA | 2.0 |  |
| 14 | sulfur | 80.5 | 4,5,8,8 |
|   | mica | 16.5 |  |
|   | PSA | 2.0 |  |
|   | $P_2S_5$ | 1.0 |  |
| 15 | sulfur | 80.5 | 3,6,6,7 |
|   | mica | 17.0 |  |
|   | PSA | 2.0 |  |
|   | LP-3 | 0.5 |  |
| 16 | sulfur | 83.0 | 0,0 (Incompat.) |
|   | mica | 16.0 |  |
|   | methylcyclopentadiene dimer | 1.0 |  |
| 17 | sulfur | 82.3 | 4,4 |
|   | mica | 16.0 |  |
|   | methylcyclopentadiene dimer | 1.0 |  |
|   | $P_2S_5$ | 0.7 |  |
| 18 | sulfur | 83.0 | 0,0 |
|   | mica | 16.0 |  |
|   | ethylidene norbornene | 1.0 |  |
| 19 | sulfur | 82.4 | 3,4 |
|   | mica | 15.9 |  |
|   | ethylidene norbornene | 1.0 |  |
|   | $P_2S_5$ | 0.7 |  |
| 20 | sulfur | 69.1 | 0,0 |
|   | marble, 200 mesh | 30.0 |  |
|   | ethylidene norbornene | 0.9 |  |
| 21 | sulfur | 68.5 | 0,0 |
|   | marble, 200 mesh |  |  |
|   | ethylidene norbornene | 0.9 |  |
|   | $P_2S_5$ | 0.6 |  |

TABLE II-continued

| Ex. No. | Components | Wt. % | No. of Cycles to Failure |
|---|---|---|---|
| 22 | sulfur | 90.0 | 0, 0 |
|  | talc, mistron vapor | 6.4 |  |
|  | glass fiber | 1.8 |  |
|  | DCP | 1.8 |  |
| 23 | sulfur | 89.4 | 0, 0 |
|  | talc, mistron vapor | 6.4 |  |
|  | glass fiber | 1.8 |  |
|  | DCP | 1.8 |  |
|  | $P_2S_5$ | 0.7 |  |
| 24 | sulfur | 83.0 | 7, 9 |
|  | mica | 16.0 |  |
|  | alpha-pinene | 1.0 |  |
| 25 | sulfur | 81.9 | 13, 13 |
|  | mica | 16.0 |  |
|  | alpha-pinene- |  |  |
|  | $P_2S_5$ conc. | 2.1 |  |

EXAMPLES 26–33 and 37–49

To a three-liter, three-necked round-bottom flask with mechanical stirrer and reflux condenser was charged 2566 g of molten sulfur at 150° C., followed by 21.7 g of phosphorus pentasulfide. After stirring for 1 hour, whereupon the phosphorus sulfide had dissolved, 20.2 g of diethylene glycol was added. The mixture was stirred at 150° C. for 16 hours. Then 496 g of P-80F mica, 30%–40% ≧325 mesh from U.S. Gypsum, was added and the mixture was stirred slowly for 0.5 hour. Results from testing this sample appear in Examples 26 and 34. Other samples in Tables III and V were prepared in a similar manner, with some variation in stirring time (3 to 18 hours) and temperature (140°–160° C. except for two of the four samples of Example 29, prepared at 150° C. and then heated to 200° C.).

TABLE III

CRACKING AND ADHESION TEST

| Example No. | Sulfur | P-80F Mica | Plasticizer |  | No. of Cycles to Failure | Cycles Survived Without Failing |
|---|---|---|---|---|---|---|
| 26 | 82.7 | 16.0 | $P_2S_5$ | 0.7 | 15, 15 |  |
|  |  |  | Diethylene Glycol | 0.65 |  |  |
| 27 | 82.6 | 16.0 | $P_2S_5$ | 0.7 | 14, 15 |  |
|  |  |  | Thiodiglycol | 0.77 |  |  |
| 28 | 82.9 | 16.0 | $P_2S_5$ | 0.7 | 10, 11 |  |
|  |  |  | Thiodiglycol | 0.38 |  |  |
| 29 | 82.9 | 16.0 | $P_2S_5$ | 0.7 | 8, 9, 12 |  |
|  |  |  | Ethylene glycol | 0.39 | 14 |  |
| 30 | 81.8 | 16.5 | $P_2S_5$ | 0.7 | 14, 15 | 15, 15 |
|  |  |  | Mercaptoethanol | 1.0 |  |  |
| 31 | 83.3 | 16.0 | $P_2S_5$ | 0.7 | 6, 6 |  |
| 32 | 83.0 | 16.0 | Mercaptoethanol | 1.0 | 2, 3 |  |
| 33 | 83.4 | 16.0 | Diethylene Glycol | 0.65 | 0, 0 |  |

EXAMPLES 34–36

In Table IV, results of a different test are presented. A sulfur composition was prepared by adding to molten sulfur heated to 150° C. with stirring in a three-neck round-bottom flask with reflux condenser, an amount of dicyclopentadiene followed by an amount of P-80F mica such that the final composition was 83.0% sulfur, 1.0% dicyclopentadiene, and 16.0% mica. The mixture was stirred at 150° C. for approximately two hours, then poured into molds ½-inch deep and 7 inches long. The blocks were cut into ¾-inch wide strips and tested for flexural strength about one week after pouring. Results of this and two other compositions similarly prepared are shown in Table IV.

Similar strips were divided into two groups. One group was kept in 2 N sulfuric acid at 140° F. for seven days. The other was kept in air at 140° F. as a control. Even though phosphorus sulfide greatly weakens the acid resistance of plain sulfur, Table IV shows that the combination DCP-$P_2S_5$ was superior to DCP alone in terms of retention of flexural strength for a composition containing sulfur and mica.

Compression samples were cast in glass molds about 0.9″ in diameter and were cut to about 1.8″ in length. Tensile specimens with flared ends and about ½″ square at the waist were cast in thick metal molds.

TABLE IV

FLEXURAL STRENGTH AND ACID RESISTANCE

| Ex. No. | Components, Wt. % |  | Flexural Strength, psi, Control in Air, 75° F. | Flexural Strength, psi, Control in Air, 140° F. | Flexural Strength, psi, After 1 week, 140° F. in 2N $H_2SO_4$ | Retention of Strength Vs. 75° F. Control, % | Retention of Strength Vs. 140° F. Control, % |
|---|---|---|---|---|---|---|---|
| 34 | Sulfur | 83.0 | 2360 | 1830 | 1410 | 60 | 77 |
|  | Mica | 16.0 |  |  |  |  |  |
|  | Dicyclopentadiene | 1.0 |  |  |  |  |  |
| 35 | Sulfur | 83.3 | 2510 | 1920 | 930 | 37 | 48 |
|  | Mica | 16.0 |  |  |  |  |  |
|  | $P_2S_5$ | 0.7 |  |  |  |  |  |
| 36 | Sulfur | 81.4 | 2570 | 1870 | 1620 | 63 | 87 |
|  | Mica | 16.9 |  |  |  |  |  |
|  | Dicyclopentadiene | 1.0 |  |  |  |  |  |
|  | $P_2S_5$ | 0.7 |  |  |  |  |  |

TABLE V

STRENGTH

| Ex. No. | Sulfur | P-80F Mica | Plasticizer | | Strength, psi | Modulus × 10$^{-5}$, psi | Tensile Strength, psi | Compressive Strength, psi |
| --- | --- | --- | --- | --- | --- | --- | --- | --- |
| 37 | 82.7 | 16.0 | $P_2S_5$ | 0.7 | 1560 | 7 | 1200 | 3800 |
|    |      |      | Diethylene glycol | 0.65 | | | | |
| 38 | 82.6 | 16.0 | $P_2S_5$ | 0.7 | 1510 | 6 | 1200 | 4000 |
|    |      |      | Thiodiglycol | 0.77 | | | | |
| 39 | 81.8 | 16.5 | $P_2S_5$ | 0.7 | 1720 | 9 | 1350 | 3400 |
|    |      |      | Mercaptoethanol | 1.0 | | | | |
| 40 | 81.9 | 16.8 | $P_4S_3$ | 0.33 | 1300 | 5.4 | 1400 | 3650 |
|    |      |      | 2-Mercaptoethanol | 1.0 | | | | |
| 41 | 81.6 | 16.7 | $P_4S_3$ | 0.34 | 2300 | 10.3 | 1500 | 6600 |
|    |      |      | Ethylene glycol | 0.38 | | | | |
|    |      |      | DCP | 1.0 | | | | |
| 42 | 80.6 | 16.4 | $P_4S_3$ | 0.67 | 2400 | 4.8 | 1550 | 3800 |
|    |      |      | Ethylene glycol | 0.38 | | | | |
|    |      |      | DCP | 2.0 | | | | |
| 43 | 83.3 | 13.2 | $P_4S_3$ | 0.69 | 2300 | 5.5 | 1300 | 4000 |
|    |      |      | Ethylene glycol | 0.78 | | | | |
|    |      |      | DCP | 2.0 | | | | |
| 44 | 78.4 | 19.6 | $P_4S_3$ | 0.33 | 2200 | 8.9 | 1550 | 5200 |
|    |      |      | Thiodiglycol | 0.72 | | | | |
|    |      |      | DCP | 1.0 | | | | |
| 45 | 82.8 | 13.1 | $P_4S_3$ | 0.68 | 1700 | 4.0 | 1550 | 3550 |
|    |      |      | Thiodiglycol | 1.5 | | | | |
|    |      |      | DCP | 1.9 | | | | |
| 46 | 81.2 | 16.5 | $P_4S_3$ | 0.33 | 2200 | 7.3 | 1500 | 4800 |
|    |      |      | 2-Mercaptoethanol | 1.0 | | | | |
|    |      |      | DCP | 1.0 | | | | |
| 47 | 81.3 | 16.5 | $P_4S_3$ | 0.34 | 2100 | 6.4 | 1300 | 4250 |
|    |      |      | 2-Mercaptoethanol | 0.95 | | | | |
|    |      |      | DCP | 0.95 | | | | |
| 48 | 80.9 | 16.5 | $P_4S_3$ | 0.67 | 2200 | 6.6 | 1200 | 4300 |
|    |      |      | 2-Mercaptoethanol | 0.95 | | | | |
|    |      |      | DCP | 0.95 | | | | |
| 49 | 80.9 | 16.5 | $P_2S_5$ | 0.68 | 2300 | 8.3 | 1550 | 5100 |
|    |      |      | 2-Mercaptoethanol | 0.96 | | | | |
|    |      |      | DCP 0.96 | | | | | |

We claim:

1. A composition comprising 50 to 98 weight percent sulfur, 0.1 to 25 weight percent glycol to plasticize the sulfur, 1 to 40 weight percent mica, and 0.02 to 5 weight percent phosphorus sulfide.

2. A composition in accordance with claim 1 wherein the composition is prepared by steps including reacting molten sulfur with said glycol and the phosphorus sulfide at a temperature between 105° and 160° C. and mixing the molten material with mica.

3. A composition in accordance with claim 1 wherein the amount of mica is 10 to 20 weight percent.

4. A plasticized sulfur composition comprising at least 50 weight percent sulfur, 0.1 to 5 weight percent ethylene glycol or diethylene glycol, 5 to 30 weight percent mica, 0.1 to 5 weight percent $P_2S_5$.

* * * * *

UNITED STATES PATENT AND TRADEMARK OFFICE
CERTIFICATE OF CORRECTION

PATENT NO. : 4,308,072
DATED : December 29, 1981
INVENTOR(S) : Ronald A. Schneider and Milutin Simic It is certified that error appears in the above-identified patent and that said Letters Patent are hereby corrected as shown below:

Col. 3, line 13, "alcohol" should read --compound--.

Signed and Sealed this

Twenty-fifth Day of May 1982

[SEAL]

Attest:

GERALD J. MOSSINGHOFF

Attesting Officer    Commissioner of Patents and Trademarks